3,336,918
RADIOPAQUE, URETHANE-COATED CATHETER AND METHOD FOR COATING SAME
Norman C. Jeckel, Glen Falls, N.Y., assignor to United States Catheter & Instrument Corporation, Glen Falls, N.Y., a corporation of New York
No Drawing. Filed Dec. 24, 1962, Ser. No. 246,685
9 Claims. (Cl. 128—2.05)

This invention relates to new and useful improvements in extending the pot life of urethane compounds in the presence of heavy metals which normally catalyze the urethane reaction and more particularly seeks to provide a method for coating cardiac catheters with urethane and heavy metal to produce a radiopaque catheter.

One type of catheter is braided (could be knitted or woven) nylon, Dacron (Du Pont trademark for polyethylene glycol terephthalate), Orlon (Du Pont trademark for polyacrylonitrile) and similar materials. These, in turn, must be coated which heretofore has usually been an oleoresin which is not entirely satisfactory from hardness and pliability aspects. In view of the twisting route a cardiac catheter may take and the critical areas involved, it is essential that the catheter retain a hard smooth but flexible finish that is flex-resistant.

Polyurethane coatings have been found to give an excellent finish. They can be sprayed, dipped or otherwise applied and allowed to air dry or be baked at temperatures up to 300° F. The flexibility range is wide and may be varied at will by choice of starting materials, it being well known that polyurethanes are produced by reacting any polyhydroxyl material with a diisocyanate-bearing product. This reaction continues until the urethane is hard, one of the critical aspects being pot-life, as the material must be applied to the catheter while still fluid, i.e., before the reaction has finished. Thus the urethane hardens, as the reaction finishes after spraying or otherwise applying to the catheter.

The urethane coatings are non-toxic, have low tissue reactivity, are abrasion resistant, have excellent glossy finishes, do not saponify or otherwise react with soaps and cleaning solvents, and do not result in fibril reactions, as no microscopic dirt particles cling to the film.

It is essential in most instances for cardiac catheters to be radiopaque in order to follow the path of introduction on the fluoroscope. Accordingly, conventional radiopaque metal powders such as tin, lead and bismuth have been added to the urethane while still fluid. However, these heavy metals accelerate the urethane reaction so that the material in the pot becomes hard almost immediately. In fact, this acceleration is so critical that urethanes are generally made in stainless steel kettles, as even a soldered joint (lead and tin) will unduly hasten the reaction. Phenol may be added to stop the reaction but this requires heating to 300° F. to drive off the phenol before the reaction will continue.

Therefore, it is an object of this invention to provide a specific anti-reactant for urethanes and particularly to overcome the catalytic effect of heavy metal powder so as to have sufficient pot-life for practical working conditions.

I have found that small amounts of diglycolic acid, i.e., $O(CH_2COOH)_2$ will control or halt the catalytic action of the heavy metal powder on the urethane reaction.

With the above objects and features in view, the nature of which will be more apparent, the invention will be more fully understood by reference to the accompanying detailed description and the appended claims.

A prepolymer (commercially available partially reacted tolylene diisocyanate with 10.7% free NCO groups remaining) is diluted to 40% solids with butyl acetate and toluene as the solvent. Sufficient castor oil to react with the free NCO group is blended in a ball mill with tin powder (10–40 microns). The diglycolic acid is dissolved in 10% alcohol and then added to the solvent before dilution therewith of the prepolymer. The acid may be added to the castor oil-tin mixture just as long as it precedes the mixing of NCO and OH groups which start the urethane reaction. Then all the material is mixed to form a spraying mixture for application to the catheters. The total proportions by weight are tin 40%, urethane solids 60% and diglycolic acid 0.001%. Whereas this mixture would have a 15 minute pot-life without diglycolic acid, with only 0.001% acid the pot-life is about two days. With 0.1%, the pot-life would be about three weeks.

The preferred range of diglycolic acid is 0.0005% (below which it is difficult to measure) to 0.5% (above which the pot-life will be longer than normally necessary) and up to 2%, although these higher amounts do not increase the pot-life in proportion to the smaller amounts. The heavy metal, i.e., tin, lead or bismuth is preferably from 5 (below which the radiopacity is weak) to 50% (above which the mechanical properties of the urethane become effected).

The preferred range of diglycolic acid is 0.0005% (be- urethane reaction with or without the presence of heavy metals but the acid effectiveness is more dramatically shown in overcoming the catalytic effect of these metals. The chemistry and technology of the urethanes have been highly developed in the last few years and no attempt is made herein to disclose what is generally known to the art. The most prominent polyhydroxyl materials have been polyethers, castor oil and polyesters listed in their order of increasing cross-linkage of the final urethanes and thus increased hardness, although different polyesters are quite variable in this regard. The intermediate castor oil is preferable but a mixture with the others may be used to adjust the final hardness and particularly a polyester with castor oil to increase the hardness.

I claim:
1. A radiopaque fabric cardiac catheter uniformly coated with a mixture of polyurethane and 5 to 50% by weight of said mixture of a metal selected from the group consisting of tin, lead and bismuth.
2. The catheter of claim 1 wherein said metal is tin.
3. The catheter of claim 1 wherein said metal is lead.
4. The catheter of claim 1 wherein the polyhydroxyl component of said polyurethane is castor oil.
5. The catheter of claim 1 wherein the polyhydroxyl component of said polyurethane is a mixture of castor oil and a polyester.
6. The catheter of claim 4 wherein the diisocyanate-bearing product of said polyurethane is tolylene diisocyanate.
7. A method of coating articles comprising preparing a reactive mixture including a polyhydroxyl material and a diisocyanate-bearing product to form a polyurethane, including in said mixture a finely divided radiopaque metal selected from the group consisting of tin, lead and bismuth and normally effective to greatly accelerate the reaction between said polyhydroxyl material and said diisocyanate-bearing product, inhibiting the accelerated reac- tion between said polyhydroxyl material and said diisocyanate-bearing product in the presence of said metal by incorporating in said reactive mixture a sufficient amount of diglycolic acid to inhibit said accelerated reaction, and coating an article with the resultant product while said reaction continues.

8. The method of claim 7 wherein said diglycolic acid is 0.0005 to 0.05% by weight of the total mixture solids.

9. The method of claim 8 wherein said metal is 5 to 50% by weight of said total solids.

References Cited

UNITED STATES PATENTS

| | | | |
|---|---|---|---|
| 2,183,226 | 12/1939 | Rein | 117—161 |
| 2,212,334 | 8/1940 | Wallerich | 128—349 X |
| 2,472,485 | 6/1949 | Krippendorf | 128—349 X |
| 2,545,918 | 3/1951 | Davis et al. | 117—161 |
| 2,591,884 | 4/1952 | Simon et al. | 260—2.5 |
| 2,602,783 | 7/1952 | Simon et al. | 260—2.5 |
| 2,855,386 | 10/1958 | Campbell | 260—77.5 |
| 2,857,915 | 10/1958 | Sheridan | 128—349 |
| 2,921,916 | 1/1960 | Harrison et al. | 260—2.5 |
| 2,933,477 | 4/1960 | Hostettler | 260—77.5 |

FOREIGN PATENTS 703,153   1/1954   Great Britain.

WILLIAM D. MARTIN, *Primary Examiner.*

RICHARD D. NEVIUS, *Examiner.*

K. G. WHEELESS, R. HUSACK, *Assistant Examiners.*

UNITED STATES PATENT OFFICE
CERTIFICATE OF CORRECTION

Patent No. 3,336,918　　　　　　　　　Dated August 22, 1967

Inventor(s) Norman C. Jeckel

It is certified that error appears in the above-identified patent and that said Letters Patent are hereby corrected as shown below:

Column 2, line 29, "The preferred range of diglycolic acid is 0.0005% (be-" should read -- The diglycolic acid can be used to halt or control the --.

Signed and sealed this 29th day of June 1971.

(SEAL)
Attest:

EDWARD M. FLETCHER, JR.　　　　　　　WILLIAM E. SCHUYLER, JR.
Attesting Officer　　　　　　　　　　　Commissioner of Patents